E. G. SCHLEICHER.
MOTOR VEHICLE.
APPLICATION FILED APR. 12, 1915.
1,190,194.
Patented July 4, 1916.
3 SHEETS—SHEET 1.
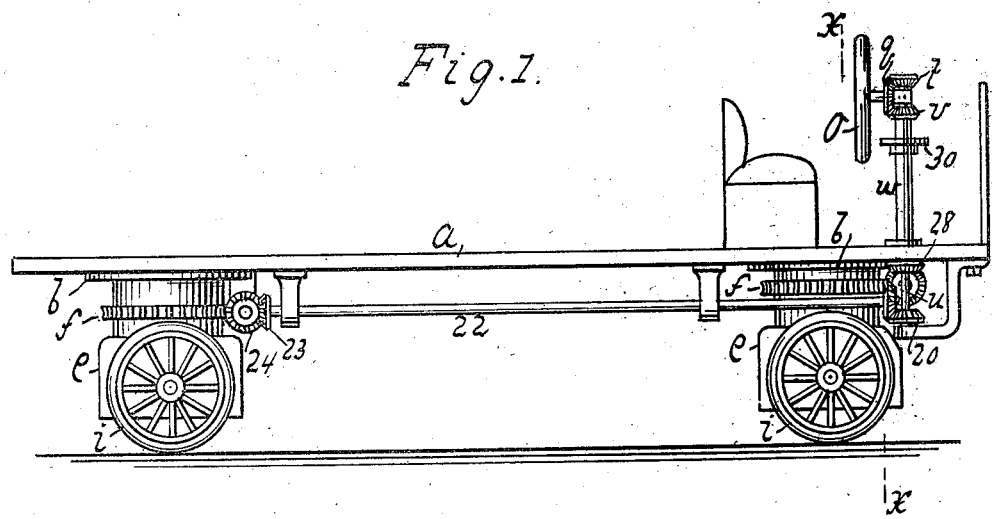
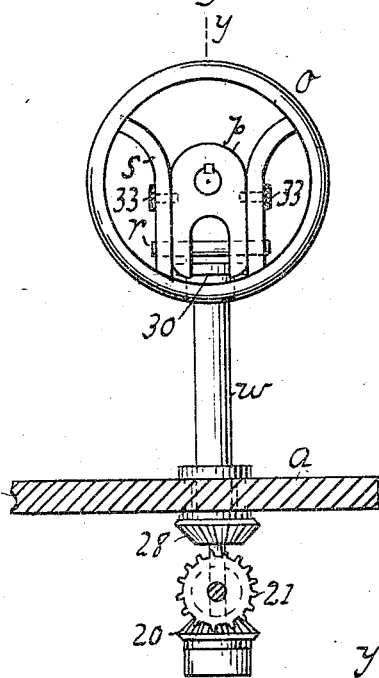 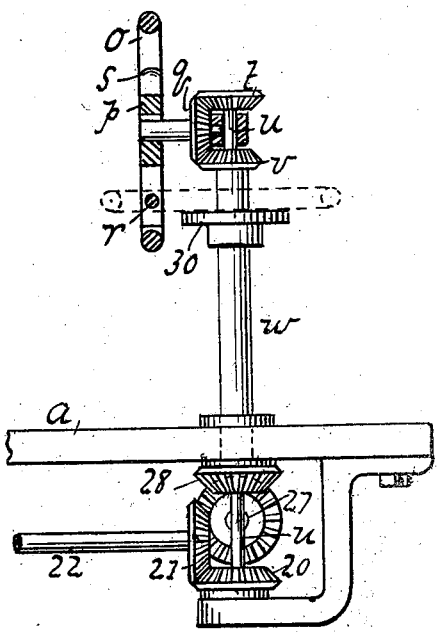
Witnesses:
William Miller
Chris. H. Almstaedt
Inventor
Edward G. Schleicher
By his Attorneys

E. G. SCHLEICHER.
MOTOR VEHICLE.
APPLICATION FILED APR. 12, 1915.

1,190,194.

Patented July 4, 1916.
3 SHEETS—SHEET 2.

Witnesses:
William Miller
Chris. H. Almstaedt

Inventor
Edward G. Schleicher
By his Attorneys

UNITED STATES PATENT OFFICE.

EDWARD G. SCHLEICHER, OF STAMFORD, CONNECTICUT.

MOTOR-VEHICLE.

1,190,194.   Specification of Letters Patent.   Patented July 4, 1916.

Application filed April 12, 1915. Serial No. 20,693.

*To all whom it may concern:*

Be it known that I, EDWARD G. SCHLEICHER, a citizen of the United States, residing at Stamford, in the county of Fairfield and State of Connecticut, have invented new and useful Improvements in Motor-Vehicles, of which the following is a specification.

This invention relates to the steering and running mechanism of a motor driven vehicle, the object being to give positive traction and to avoid skidding or side slip of both the rear or front wheels when the vehicle is steered at a sharp angle to accomplish a short turn.

Another object of the invention is, to provide a wheel base of any length, and by means of the peculiar steering and running devices the front and rear wheel trucks can be steered to any degree without movement of the frame or chassis.

The invention includes a plurality of oscillating wheel carrying trucks arranged in pairs at the forward and rear portion of the frame. Each truck is eccentrically mounted on the frame so that when a truck is oscillated to steer the vehicle the throw of the wheels will be varied, for example the arc of oscillation of each inner wheel of a truck will be shorter than the outer wheel, thereby facilitating the turning movement of the vehicle with less expenditure of power.

The invention comprehends a movable steering wheel combined with gear devices, the steering wheel being adapted to be shifted by the operator to convert rotary into planetary movement thereby giving variable turning movement to the forward and rear trucks when it is desired to steer the vehicle to the right or left or in turning corners.

Figure 4:
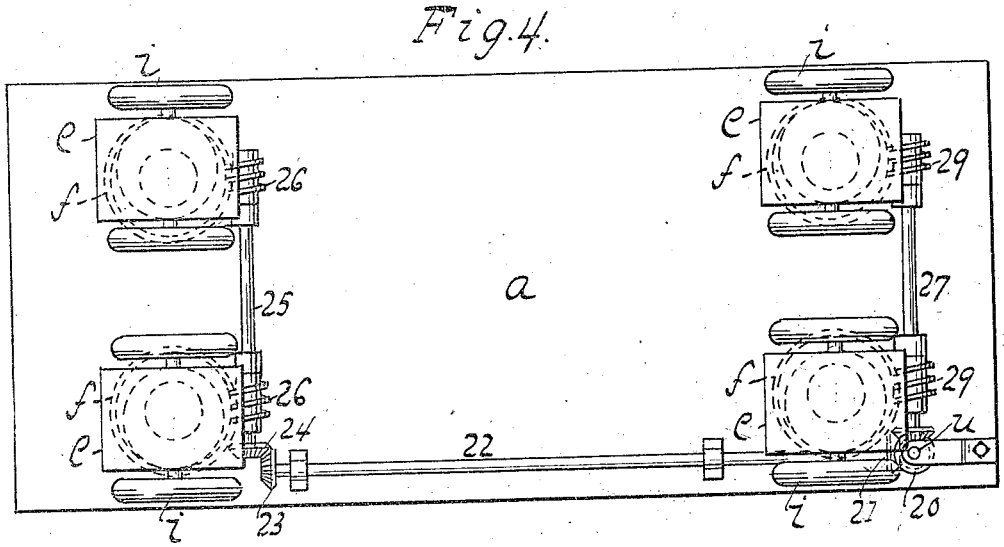
Figure 5:
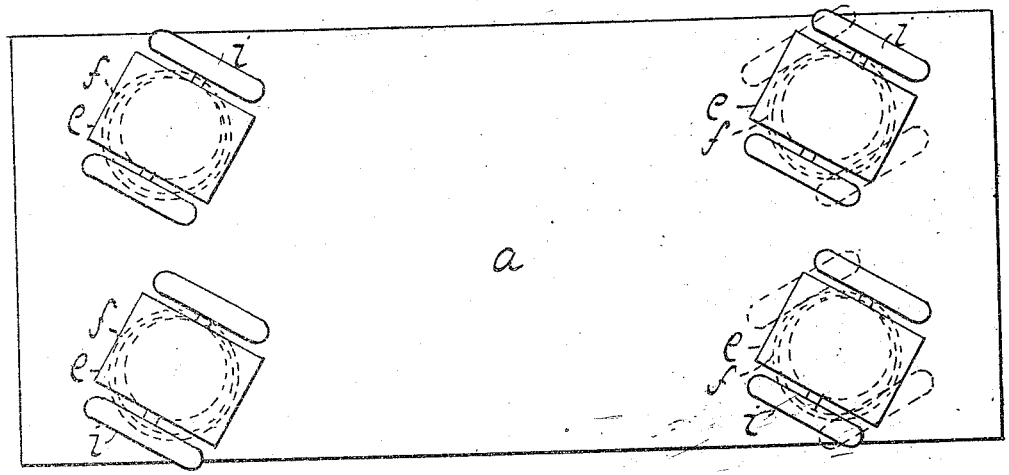
Figure 6:
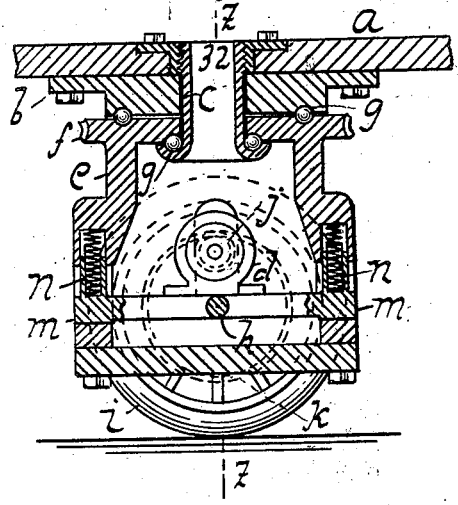
Figure 7:
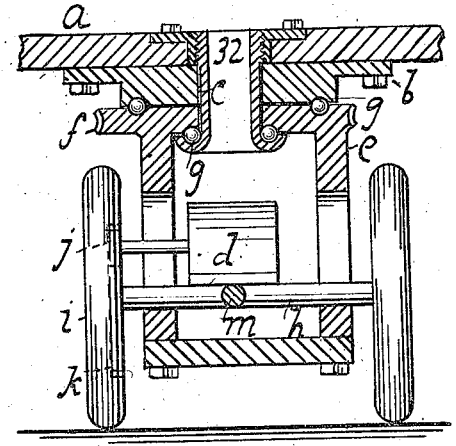
Figure 8:
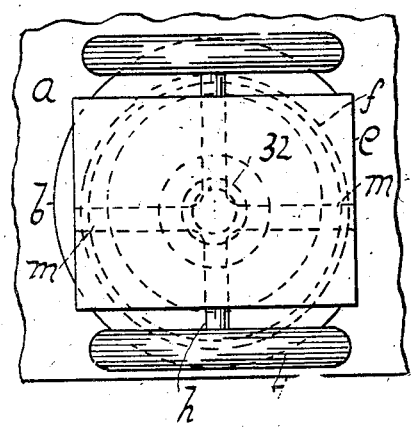
Figure 9:
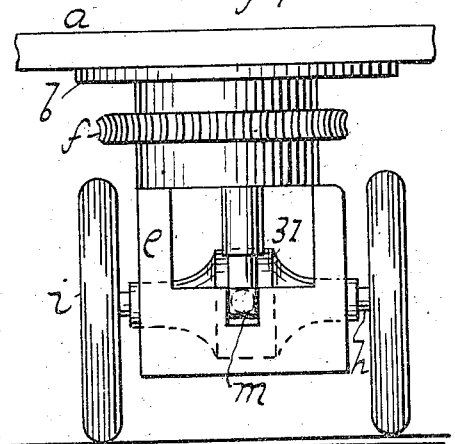

The invention is more fully described in the following specification and claims and illustrated in the accompanying drawings in which:

Figure 1 represents a side elevation of a motor truck embodying this invention. Fig. 2 is a vertical section taken along the line $x$—$x$ of the same on a larger scale. Fig. 3 is a vertical section taken along the line $y$—$y$ of Fig. 2. Fig. 4 is an inverted plan view of Fig. 1. Fig. 5 is a diagram showing the method of steering the vehicle. Fig. 6 is a vertical section of one of the trucks. Fig. 7 is a vertical section along the line $z$ $z$ of the same. Fig. 8 is an inverted plan view of the same. Fig. 9 is a rear elevation of a modification.

In these drawings the letter $a$ designates a frame to the under portion of which is secured a plurality of hangers $b$. There are two of these hangers located at the forward and two at the rear end of the frame. Each hanger has a central opening $c$ suitable for the terminal wires of a motor $d$ to pass through. Each hanger has mounted thereon an oscillating hollow truck $e$ having a worm gear $f$ disposed at the upper end of the truck. Ball bearings $g$ arranged between the truck and the hanger will give easy rotation to the truck. A sleeve 32 secured to the frame coacts with the lower ball race. This sleeve serves to adjustably connect the hanger with the oscillating truck to eliminate vertical displacement of the truck relative to the frame. Coacting with the truck is an axle $h$ having mounted thereon a pair of wheels $i$. As indicated in Fig. 7, the motor is adapted by means of a pinion $j$, in engagement with a gear ring $k$ secured to a wheel to propel the vehicle. The axle is provided with a balancing arm or bar $m$ projecting at right angles from each side of the axle. The bar is slightly at one side of the central portion of the axle, so that the weight on the traction or driving wheel will be slightly in excess of the opposite wheel giving positive adhesion to the ground. In this construction no differential gear is required, inasmuch as only one wheel of each truck is propelled.

Where two wheels of each truck are propelled to give better traction for large heavy vehicles, as denoted in Fig. 9, the employment of a differential gear of well known construction will be necessary to take up the variable speeds of the two wheels when turning corners. In this device the bar $m$ can be secured to a differential gear case 31 in a line with the axis of the two wheels and the weight equally distributed.

It will be seen that the trucks are eccentrically mounted on the hangers with the centers of oscillation nearer to the central longitudinal axis of the frame relative to the hangers, as indicated in Figs. 4 and 5, so that the throw of each inner wheel will be less than the outer to give better distribution of the load and requiring a smaller arc of oscillation for a given turn.

As shown in the drawing the bar $m$ extends from each side of the axle and the ends thereof coact with spring buffers $n$ to take up the jars sustained by the frame and the trucks. This form of rocking balanced axle will take up any shock given to the wheels by striking an obstruction or any depression in the road.

The steering mechanism for the trucks includes a hand wheel $o$ which when in its normal position as shown in Fig. 1 is employed for steering the vehicle to the right or left as indicated in full lines in Fig. 5. This hand or steering wheel is secured by means of a yoke member $p$ to the shaft of a planetary gear $q$, and the yoke member is swingingly mounted at $r$ to the arms $s$ of the steering wheel. The planetary gear $q$ engages a gear $h$ having a post $u$ and also gear $v$ provided with a sleeve $w$ encircling the post. The post $u$ has at its lower end a bevel gear 20 for engagement with a corresponding bevel gear 21 on one end of a longitudinal transmission shaft 22 the other end of the shaft having a gear 23 to engages a gear $t$ having a post $u$ and also 25. This shaft is provided with worms 26 for engagement with each of the said worm gears $f$ forming a portion of the rear trucks. When the shaft $u$ is actuated by the operation of the steering wheel it rotates the transmission shaft 22 thus transmitting motion to the transverse shaft 25 and the pair of rear trucks.

The planetary gear $q$ when actuated also transmits motion to the sleeve $q$ by means of the said bevel gear $v$ which in turn revolves a forward transverse shaft 27 by a gear 28 secured to the lower portion of the sleeve. This transverse shaft 27 has worms 29 for engagement with the worm gears $f$ of the forward truck. It will be understood that when the steering wheel is operated it simultaneously transmits motion to the post and sleeve thereby actuating both the forward and rear trucks to steer the vehicle in an angular path to the right or left. When the steering wheel is in its vertical position it is fastened in place by means of a pair of latches 33 movably mounted on the arms $s$ to engage the yoke member.

When it is desired to turn sharp angles or corners the steering wheel can be swung over the differential bevel gears to set horizontally on the support 30 of the sleeve, in this position the steering wheel when operated will revolve the planetary gear $q$ about each of the bevel gears fixed to the post and sleeve thereby giving planetary movement to the planetary gear and transmitting rotary movement to the bevel sun gears on the post and sleeve. This motion in the case of the rear wheels is in reverse of the forward wheels, hence actuating the forward and rear wheels as indicated in Fig. 5 in dotted lines at the forward end and full lines at the rear end. In this position the vehicle can turn sharp corners or the arc of oscillation can be varied to any degree to turn the vehicle in its own length.

I claim:—

1. In a motor vehicle the combination with a steering wheel means, of gears for actuating the means, a steering wheel connected to the gears, means for shifting the steering wheel to convert the rotary movement of one of the gears into planetary movement and change the rotation of the gears.

2. In a motor vehicle the combination with a steering wheel means, of gears including a planetary gear for actuating the means, a steering wheel mounted on the planetary gear, means for shifting the steering wheel to convert the rotary movement of the latter gear into planetary movement and change the rotation of the other gears.

3. In a motor vehicle the combination with a forward and rear wheel steering means, of gears including a planetary gear for actuating the means, a steering wheel connected to the gears, means for shifting the steering wheel to convert the rotary movement of one of the gears into planetary movement and change the rotation of the gears.

4. In a motor vehicle the combination with a steering post having a sleeve mounted thereon, of gears carried by the sleeve and the post, a planetary gear to engage the gears, and a steering wheel mounted on the planetary gear to operate the post and sleeve, and means for moving the steering wheel to convert rotary into planetary movement of the planetary gear and change the rotation of the gears.

5. In a motor vehicle the combination with a steering post having a sleeve mounted thereon, of gears carried by the sleeve and the post, a planetary gear to engage the gears, and a steering wheel mounted on the planetary gear to operate the post and sleeve, and means for swinging the steering wheel to convert rotary into planetary movement of the planetary gear and change the rotation of the gears.

6. In a motor vehicle the combination with a steering post having a sleeve mounted thereon, of bevel gears secured to the post and sleeve, a planetary bevel gear to engage the gears, a steering wheel secured to the planetary gear, and means for moving the steering wheel to convert the rotary movement of the planetary gear into planetary movement and transmit variable movement to the post and sleeve.

7. In a motor vehicle the combination with a steering post having a sleeve mounted thereon, of bevel gears secured to the post and sleeve, a planetary bevel gear to engage the gears, a steering wheel secured to the planetary gear, and means for moving the steering wheel to convert the rotary movement of the planetary gear into planetary movement.

8. In a motor vehicle the combination with a steering post having a sleeve mounted thereon, of bevel gears secured to the post and sleeve, a planetary bevel gear to engage the gears, a steering wheel secured to the planetary gear, and means for swinging the steering wheel over the sleeve to convert the rotary motion of the planetary gear into planetary movement about the bevel gears.

9. In a motor vehicle the combination with a frame, a hanger secured to the frame, of an oscillating truck eccentrically mounted on the hanger, a sleeve for connecting the truck with the hanger, wheels carried by the truck, means for steering the truck, and means for driving the wheels.

11. In a motor vehicle the combination with a frame, of a plurality of oscillating trucks eccentrically mounted on the frame, wheels carried by the trucks, means for steering the trucks, and means for driving the wheels.

12. In a motor vehicle the combination with a frame, of a plurality of oscillating trucks eccentrically mounted on the forward and rear portion of the frame, wheels carried by the trucks, means for simultaneously steering the trucks, and means for driving the wheels.

13. In a motor vehicle the combination with a frame, of pairs of oscillating trucks eccentrically mounted at the forward and rear portion of the frame, a pair of wheels carried by each truck, means for simultaneously steering the trucks to any degree, and means for driving the wheels.

14. In a motor vehicle the combination with a frame, of pairs of oscillating trucks eccentrically mounted at the forward and rear portion of the frame, a rocking axle carried by each truck, a pair of wheels carried by the axle, means for simultaneously steering the trucks to any degree, and means for driving the wheels.

15. In a motor vehicle the combination with a frame, of pairs of oscillating trucks eccentrically mounted at the forward and rear portion of the frame, a rocking axle carried by each truck and having an arm for yielding connection with the truck, a pair of wheels carried by the axle, means for simultaneously steering the trucks to any degree, and means for driving the wheels.

In testimony whereof I have hereunto set my hand in the presence of two subscribing witnesses.

EDWARD G. SCHLEICHER.

Witnesses:
 WM. E. WARLAND,
 CHRIS. H. ALMSTARDT.